US009652892B2

(12) United States Patent
Tomlin et al.

(10) Patent No.: US 9,652,892 B2
(45) Date of Patent: May 16, 2017

(54) MIXED REALITY SPOTLIGHT

(71) Applicant: Microsoft Technology Licensing, LLC, Redmond, WA (US)

(72) Inventors: Arthur Tomlin, Kirkland, WA (US); Tony Ambrus, Seattle, WA (US); Ron Amador-Leon, Duvall, WA (US); Nicholas Gervase Fajt, Seattle, WA (US); Ryan Hastings, Seattle, WA (US); Matthew G. Kaplan, Seattle, WA (US); Michael Scavezze, Bellevue, WA (US); Daniel McCulloch, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 294 days.

(21) Appl. No.: 14/066,442

(22) Filed: Oct. 29, 2013

(65) Prior Publication Data

US 2015/0116354 A1 Apr. 30, 2015

(51) Int. Cl.
*G06T 19/00* (2011.01)
*G06T 15/60* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 2,763,772 A * 9/1956 Hine .................. G03B 15/03
313/567
5,737,031 A 4/1998 Tzidon et al.
(Continued)

FOREIGN PATENT DOCUMENTS

CN 101002253 A 7/2007
DE 102009037835 A1 2/2011

OTHER PUBLICATIONS

Hughes, C. et al., "Achieving Interactive-Time Realistic Illumination in Mixed Reality," Proceedings of Army Science Conference (ASC) 2004, Orlando, FL, Nov. 2004, 7 pages.
(Continued)

*Primary Examiner* — James A Thompson
(74) *Attorney, Agent, or Firm* — Alleman Hall Creasman & Tuttle LLP (57) ABSTRACT

Various embodiments relating to creating a virtual shadow of an object in an image displayed with a see-through display are provided. In one embodiment, an image of a virtual object may be displayed with the see-through display. The virtual object may appear in front of a real-world background when viewed through the see-through display. A relative brightness of the real-world background around a virtual shadow of the virtual object may be increased when viewed through the see-through display. The virtual shadow may appear to result from a spotlight that is fixed relative to a vantage point of the see-through display.

16 Claims, 8 Drawing Sheets

(51) Int. Cl.
*G06F 3/01* (2006.01)
*G02B 27/01* (2006.01)
*G02B 27/00* (2006.01)

(52) U.S. Cl.
CPC .............. *G06F 3/011* (2013.01); *G06T 15/60* (2013.01); *G02B 27/0172* (2013.01); *G02B 2027/0118* (2013.01); *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 5,742,749 | A | 4/1998 | Foran et al. |
| 6,301,442 | B1 | 10/2001 | Uchida et al. |
| 6,307,526 | B1 | 10/2001 | Mann |
| 6,614,408 | B1 | 9/2003 | Mann |
| 6,933,948 | B2 | 8/2005 | Gonsalves |
| 7,301,547 | B2 | 11/2007 | Martins et al. |
| 7,508,455 | B2 | 3/2009 | Liu et al. |
| 7,623,137 | B1 | 11/2009 | Miller |
| 8,243,061 | B2 | 8/2012 | Matsumura et al. |
| 8,405,680 | B1 | 3/2013 | Cardoso Lopes et al. |
| 2002/0175914 | A1 | 11/2002 | Marshall et al. |
| 2003/0014212 | A1 | 1/2003 | Ralston et al. |
| 2005/0007460 | A1* | 1/2005 | Stavely ................ H04N 5/3532 348/222.1 |
| 2005/0195332 | A1 | 9/2005 | Sakagawa et al. |
| 2006/0164523 | A1 | 7/2006 | Jiang et al. |
| 2007/0038944 | A1 | 2/2007 | Carignano et al. |
| 2007/0188522 | A1 | 8/2007 | Tsuyuki |
| 2007/0236485 | A1 | 10/2007 | Trepte |
| 2008/0044095 | A1 | 2/2008 | Albiez |
| 2008/0144962 | A1 | 6/2008 | Jung et al. |
| 2009/0128552 | A1 | 5/2009 | Fujiki et al. |
| 2009/0225001 | A1 | 9/2009 | Biocca et al. |
| 2009/0231548 | A1 | 9/2009 | Kondo et al. |
| 2009/0279178 | A1* | 11/2009 | Cui .................... G02B 27/0988 359/613 |
| 2010/0281436 | A1* | 11/2010 | Kipman .................. A63F 13/06 715/863 |
| 2010/0287500 | A1 | 11/2010 | Whitlow et al. |
| 2010/0295851 | A1 | 11/2010 | Diamond |
| 2011/0002508 | A1 | 1/2011 | Basso et al. |
| 2011/0213664 | A1 | 9/2011 | Osterhout et al. |
| 2011/0234619 | A1 | 9/2011 | Tokunaga |
| 2011/0234631 | A1* | 9/2011 | Kim ........................ G06T 15/60 345/632 |
| 2012/0026079 | A1 | 2/2012 | Maciesowicz et al. |
| 2012/0092328 | A1* | 4/2012 | Flaks ................... G02B 27/017 345/419 |
| 2012/0176410 | A1* | 7/2012 | Meier ..................... G06F 3/011 345/633 |
| 2013/0141434 | A1 | 6/2013 | Sugden et al. |
| 2013/0147826 | A1 | 6/2013 | Lamb |
| 2013/0208014 | A1 | 8/2013 | Fleck et al. |
| 2013/0215395 | A1* | 8/2013 | Li .......................... G02B 13/16 353/34 |
| 2015/0042844 | A1* | 2/2015 | Shu ........................ H04N 9/735 348/224.1 |
| 2015/0077599 | A1* | 3/2015 | Chen .................... H04N 5/3572 348/251 |

OTHER PUBLICATIONS

ISA Korean Patent Office, International Search Report and Written Opinion Issued in Application No. PCT/US2012/069316, Mar. 4, 2013, WIPO, 9 pages.

Azuma, R., "The Challenge of Making Augmented Reality Work Outdoors," Mixed Reality: Merging Real and Virtual Worlds, Chapter 21, Mar. 1999, 10 pages.

Chuang, Y. et al., "Shadow Matting and Compositing," ACM Transactions on Graphics (TOG)—Proceedings of ACM SIGGRAPH 2003, vol. 22, No. 3, Jul. 2003, 7 pages.

Katayama, Akihiro et al., "Shading and Shadow-Casting in Image-Based Rendering Without Geometric Models", ACM SIGGRAPH Conference on Abstracts and Applications, Aug. 8, 2009, 1 page.

Knecht, Martin et al., "Reciprocal Shading for Mixed Reality", Journal of Computers & Graphics, vol. 36, Issue 7, Oct. 18, 2012, 11 pages.

Konttinen, Jaakko et al., "Real-time Illumination and Shadowing by Virtual Lights in a Mixed Reality Setting", http://graphics.cs.ucf.edu/MAR-Sumant/1568936265.pdf, May 17, 2005, 9 pages.

Sato, Imari et al., "Acquiring a Radiance Distribution to Superimpose Virtual Objects onto a Real Scene", IEEE Transactions on Visualization and Computer Graphics, vol. 5, Issue 1, Mar. 1999, 10 pages.

Sugano, Natsuki et al., "The Effects of Shadow Representation of Virtual Objects in Augmented Reality", Second IEEE and ACM International Symposium on Mixed and Augmented Reality, Oct. 7, 2003, 8 pages.

ISA European Patent Office, International Search Report & Written Opinion Issued in PCT Patent Application No. PCT/US2014/062310, Jan. 8, 2015, 11 Pages.

Naemura, et al., "Virtual Shadows in Mixed Reality Environment Using Flashlight-Like Devices", In Trans. Virtual Reality Society of Japan, vol. 7, Issue 2, Jan. 2002, 11 Pages.

Chin, Norman et al., "Fast Object-Precision Shadow Generation for Area Light Sources Using BSP Trees", Proceedings of the 1992 Symposium on Interactive 3D Graphics, Mar. 1992, 10 pages.

Kingdom, Frederick A. A. et al., "Colour Vision Brings Clarity to Shadows", Perception 2004, vol. 33, Jun. 30, 2004, pp. 907-914.

Loscos, Céline et al., "Interactive Virtual Relighting of Real Scenes." IEEE Transactions on Visualization and Computer Graphics, vol. 6, No. 4, Oct. 2000, pp. 289-305.

Santos, Pedro, et al. "Display and Rendering Technologies for Virtual and Mixed Reality Design Review", 7th International Conference on Construction Applications of Virtual Reality, Oct. 2007, pp. 165-175.

Santos, P. et al., "The Daylight Blocking Optical Stereo See-through HMD", Proceedings of the 2008 Workshop on Immersive Projection Technologies/Emerging Display Technologies, Aug. 2008, 4 pages.

Lutz, B. et al., "Virtual Dunhuang Art Cave: A Cave within a CAVE," Computer Graphics Forum, vol. 18, No. 3, Sep. 1999, 9 pages.

IPEA European Patent Office, Written Opinion of the International Preliminary Examining Authority Issued in Application No. PCT/US2014/062310, Oct. 5, 2015, WIPO, 6 pages.

IPEA European Patent Office, International Preliminary Report on Patentability Issued in Application No. PCT/US2014/062310, Jan. 25, 2016, WIPO, 8 pages.

The State Intellectual Property Office of China, First Office Action and Search Report Issued in Chinese Patent Application No. 201280061125.4, Dec. 2, 2015, China, 18 pages.

State Intellectual Property Office of the People's Republic of China, Second Office Action Issued in Application No. 201280061125A, Aug. 3, 2016, 6 pages.

\* cited by examiner

MIXED REALITY SPOTLIGHT

BACKGROUND

Various technologies may allow a user to experience a mix of real and virtual worlds. For example, some display devices, such as various head-mounted display devices, may comprise see-through displays that allow superposition of displayed images over a real-world background environment. The images may appear in front of the real-world background environment when viewed through the see-through display. In particular, the images may be displayed on the see-through display such that they appear intermixed with elements in the real-world background environment in what may be referred to as augmented reality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to creating a virtual shadow of a virtual object in an image displayed with a see-through display are provided. In one embodiment, an image of a virtual object may be displayed with the see-through display. The virtual object may appear in front of a real-world background when viewed through the see-through display. A relative brightness of the real-world background around a virtual shadow of the virtual object may be increased when viewed through the see-through display. The virtual shadow may appear to result from a spotlight that is fixed relative to a vantage point of the see-through display. In some embodiments, relative brightness may be increased in a vignette pattern.

DETAILED DESCRIPTION

The present description relates to an approach for creating a virtual shadow of a virtual object in an image displayed with a see-through display. Creating virtual shadows in this manner can make the virtual object seem more realistic. More particularly, the present description relates to increasing a relative brightness of a real-world background around the virtual shadow of the virtual object when viewed through the see-through display. Various effects may be employed to increase the relative brightness in order to make the virtual object seem more realistic.

In one example, the virtual shadow may appear to result from a virtual spotlight that is fixed relative to a vantage point of the see-through display. In other words, the position of the virtual spotlight may dynamically change as the position of the vantage point changes. Because the virtual spotlight is fixed relative to the vantage point, the virtual object can be viewed from any position and/or orientation while the virtual shadow remains viewable. On the other hand, if the virtual spotlight were globally fixed and not fixed relative to the potentially-moving vantage point, then there would be certain positions where the virtual shadow would be occluded by the virtual object or otherwise out of a user's field of view. In such situations, a user may perceive the virtual object as being less realistic due to a lack of depth queues that help provide spatial context to the virtual object in relation to the real-world background.

As another example, a relative brightness around the virtual shadow may be increased in a vignette pattern. For example, the vignette pattern may cause the relative brightness to be decreased with increasing closeness to a perimeter of the see-through display. As another example, the vignette pattern may cause the relative brightness to be decreased with increasing distance from the virtual shadow. By attenuating the relative brightness according to the vignette pattern, a contrast in brightness at the perimeter of the see-through display may be smoothed such that the see-through display blends in with the real-world background environment. Moreover, the vignette pattern may cause the see-through display to seem larger, because less focus may be placed on the perimeter of the display. On the other hand, if the relative brightness was not attenuated according to the vignette pattern, then the entire see-through display would be bathed in bright light, which could cause a harsh contrast at the perimeter of the see-through display.

In some embodiments, the vignette pattern may be rendered in screen-space coordinates of the see-through display. In other words, the vignette pattern may be locked to the user's view, and the vignette pattern may be generated independent of characteristics of the real-world background. On the other hand, in some embodiments, the relative brightness of the real-world background (e.g., the area of the see-through display enhanced by the virtual spotlight) and the virtual shadow may be rendered in world-space coordinates. In other words, a shape and/or orientation of the virtual shadow may be based on characteristics of the real-world background.

The vignette pattern may be particularly applicable to embodiments where a user's field of view may be greater than a field of view of the see-through display device such that the real-world background may be viewed outside a perimeter of the see-through display. Further, the vignette pattern may be particularly applicable to embodiments of a see-through display that includes an augmentable portion that may be augmented with image content and/or illumination and a non-augmentable portion that may not be augmented with image content and/or illumination.

Figure 1:
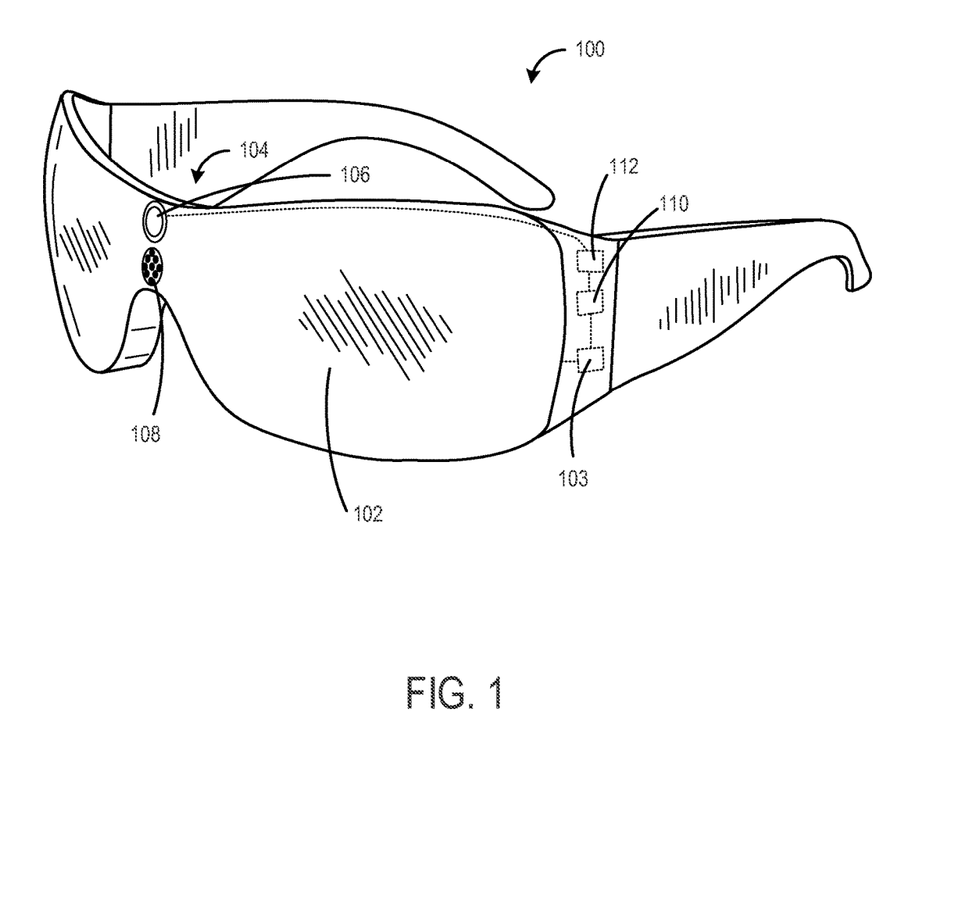
FIG. 1 shows a head-mounted display system according to an embodiment of the present description.

FIG. 1 depicts an example head-mounted display system 100. The head-mounted display system 100 takes the form of a pair of wearable glasses or goggles in FIG. 1. The head-mounted display system 100 includes a see-through display 102 that may be configured to visually augment an appearance of a physical environment to a user viewing the physical environment through the see-through display. Head-mounted display system 100 may be configured to augment the reality of a real-world environment having various lighting conditions and that includes various real-world objects having different colors and shadows.

For example, the appearance of the real-world background may be augmented by graphical content that may be presented with the see-through display 102 such that the graphical content may appear in front of the real-world background. In particular, an image production system 103 may be configured to display an image of a virtual object with the see-through display 102. Further, the image production system may be configured to increase a relative brightness of the real-world background around a virtual shadow of the virtual object when viewed through the see-through display such that the virtual shadow appears to result from a virtual spotlight.

In some embodiments, the head mounted display system may be an additive display system in which holographic light may be displayed on the see-through display. For example, one or more partially transparent pixels can emit light to a user's eye. The user can view real-world objects through and/or around the pixel, but the emitted light can seemingly illuminate the background objects viewed through and/or around the pixel.

The head-mounted display system 100 includes an optical sensor system 104 that may include one or more optical sensors. In one example, the optical sensor system 104 includes an inward facing optical sensor 106 and an outward facing optical sensor 108. The inward facing optical sensor may be configured to perform gaze detection or other analysis on the user's eyes. The outward facing optical sensor may be configured to detect the real-world background from a similar vantage point (e.g., line of sight) as observed by the user through see-through display 102. In some embodiments, the sensor subsystem may include two or more different inward and/or outward facing optical sensors (e.g., outward facing color camera and outward facing depth camera).

The head-mounted display system 100 may further include a position sensor system 110 that may include one or more position sensors (e.g., accelerometer(s), gyroscope(s), magnetometer(s), global positioning system(s), multilateration tracker(s), etc.) that output position sensor information useable to assess a position, orientation, and/or movement of the relevant sensor.

Optical sensor information received from the optical sensor system 104 and/or position sensor information received from position sensor system 110 may be used to assess a position and orientation of the vantage point of the see-through display relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 112) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space, a position of the virtual spotlight, and a size, shape, and position of virtual shadows of the virtual objects.

Figure 2:
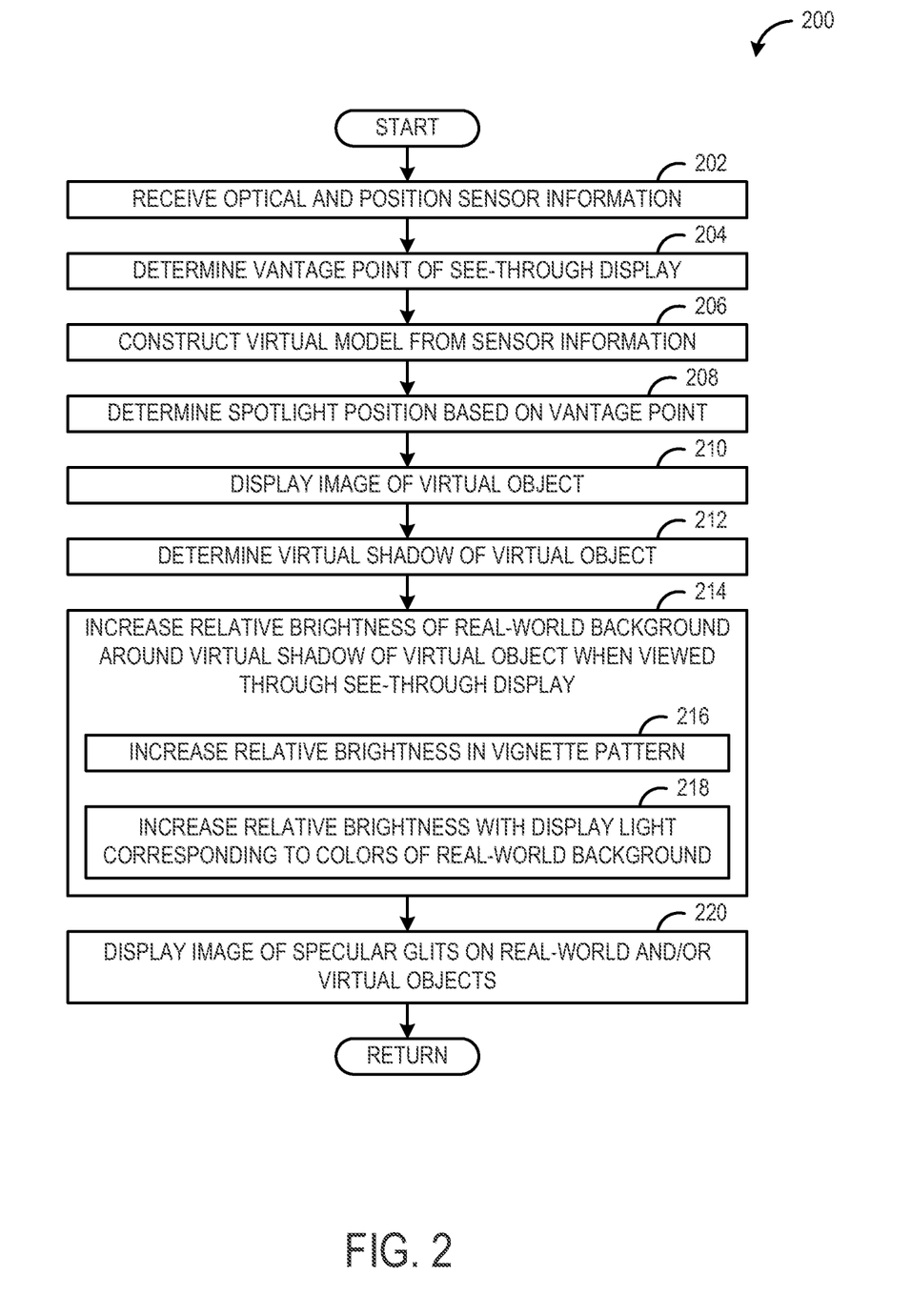
FIG. 2 shows a method of operating a see-through display according to an embodiment of the present description.

FIG. 2 shows an example method 200 of operating a see-through display according to an embodiment of the present description. In particular, the method 200 may be performed to create a virtual shadow of a virtual object in order to make the virtual object seem more realistic when viewed through the see-through display. For example, the method 200 may be performed by the head-mounted display system 100 shown in FIG. 1 or the computing system 1000 shown in FIG. 10.

At 202, the method 200 may include receiving optical and position sensor information. In one example, optical information representative of a real-world background may be provided by one or more outward facing optical sensors, such as the optical sensor 108 shown in FIG. 1. For example, the optical sensor information may include depth information, lighting information, color information, and other visual information that characterizes the real-world background. Further, position sensor information representative of a position, orientation, and/or movement of the vantage point and/or the display screen may be received by a position sensor system, such as the position sensor system 110 shown in FIG. 1.

At 204, the method 200 may include determining a vantage point of the see-through display. The vantage point may have a position and orientation. In some embodiments, the position and orientation of the vantage point may be characterized relative to the real-world background. In some embodiments, the position and orientation of the vantage point may be characterized independently or without consideration of the real-world background. In one example, the position of the vantage point may correspond to the position of the see-through display.

At 206, the method 200 may include constructing a virtual model from sensor information. The optical sensor information and the position sensor information may be used to reconstruct the real-world background and real-world objects in the virtual model. For example, the virtual model may be constructed based on the position of the vantage point relative to the real-world background. The virtual model may be used to determine size, position, and orientation information of virtual objects displayed with the see-through display as well as corresponding virtual shadows.

At 208, the method 200 may include determining a position and orientation of a virtual spotlight based on the position and orientation of the vantage point. In some embodiments, the virtual spotlight may be fixed relative to the vantage point. In one example, the virtual spotlight may be vertically offset from the vantage point and a perspective of the virtual spotlight may be angled downward relative to a perspective of the vantage point. By orienting the virtual spotlight at a downward angle fixed relative to the orientation of the vantage point, a virtual shadow may appear below a virtual object, even as the vantage point changes position (e.g., across 6 degrees of freedom).

At 210, the method 200 may include displaying an image of a virtual object with the see-through display. The virtual object may appear in front of the real-world background when viewed through the see-through display. For example, the size, the position, and the orientation of the virtual object on the see-through display may be determined based on the virtual model, and more particularly the vantage point.

At 212, the method 200 may include determining the virtual shadow of the virtual object. For example, the virtual shadow may be determined based on the position of the virtual object relative to the vantage point and the virtual spotlight. In some embodiments, the virtual shadow may be rendered in world-space coordinates. As such, the virtual shadow may be generated based on characteristics of the real-world background. For example, the virtual shadow may be further based on a surface reconstruction of the real-world background. For example, different surfaces at different depths in the real-world background may cause distortions of the virtual shadow that may be accounted for when determining the virtual shadow. In some embodiments, the virtual shadow may be determined without consideration of surfaces of the real-world background.

At 214, the method 200 may include increasing a relative brightness of the real-world background around the virtual shadow of the virtual object when viewed through the see-through display. By increasing the relative brightness around the virtual shadow, contrast may be increased to create a visual effect that causes the virtual shadow to seem darker without actively dimming the virtual shadow. However, it will be appreciated that in some embodiments a virtual shadow may be actively dimmed (e.g., through application of a filter) in conjunction with increasing the relative brightness of background around the virtual shadow.

Optionally or additionally, at 216, the method 200 may include increasing the relative brightness of the real-world background around the virtual shadow of the virtual object in a vignette pattern when viewed through the see-through display. In one example, the vignette pattern causes the relative brightness to decrease with increasing closeness to a perimeter of the see-through display. In another example, the vignette pattern causes the relative brightness to decrease with increasing distance from the virtual shadow. By attenuating the relative brightness in the vignette pattern, a visual transition between the see-through display and the real-world background may be smoothed, such that the perimeter of the see-through display may be less noticeable. In some embodiments, the vignette pattern may be rendered in screen-space coordinates. In particular, the vignette pattern may be locked to the vantage point of the see-through display, such that the vignette pattern moves with the vantage point. Further, the vignette pattern may be formed independent of the characteristics of the real-world background.

Optionally or additionally, at 218, the method 200 may include increasing the relative brightness of the real-world background around the virtual shadow of the virtual object when viewed through the see-through display with display light corresponding to colors of the real-world background. In one example, a color of the display light may be matched to a color of the real-world background. In another example, the color of the display light may be lighter or darker relative to the color of the real-world background. For example, the background color may be royal blue and the display light may be light blue. In another example, different portions of the real-world background may have a plurality of different colors and the display light may include a plurality of different colors displayed on different portions of the see-through display to correspond with the different colors of the real-world background.

Optionally or additionally, at 220, the method 200 may include displaying an image of specular glits that appear in front of real-world objects of the real-world background and/or on the virtual object when viewed through the see-through display. A specular glit may be simulated on a portion of an object where light from the virtual spotlight would be reflected in a direction of the vantage point. The specular glits may be based on the position of the real-world objects and/or virtual objects relative to the virtual spotlight and the vantage point. For example, the specular glits may be determined from surface reconstruction of the real-world background in the virtual model as well as virtual and real light information. The specular glits may be formed by saturating pixels corresponding to the glit positions with bright light.

The method may be performed to create a virtual shadow of a virtual object with a see-through display that helps provide spatial context in relation to the real-world background environment. Accordingly, an augmented reality may seem more realistic.

Figure 3:
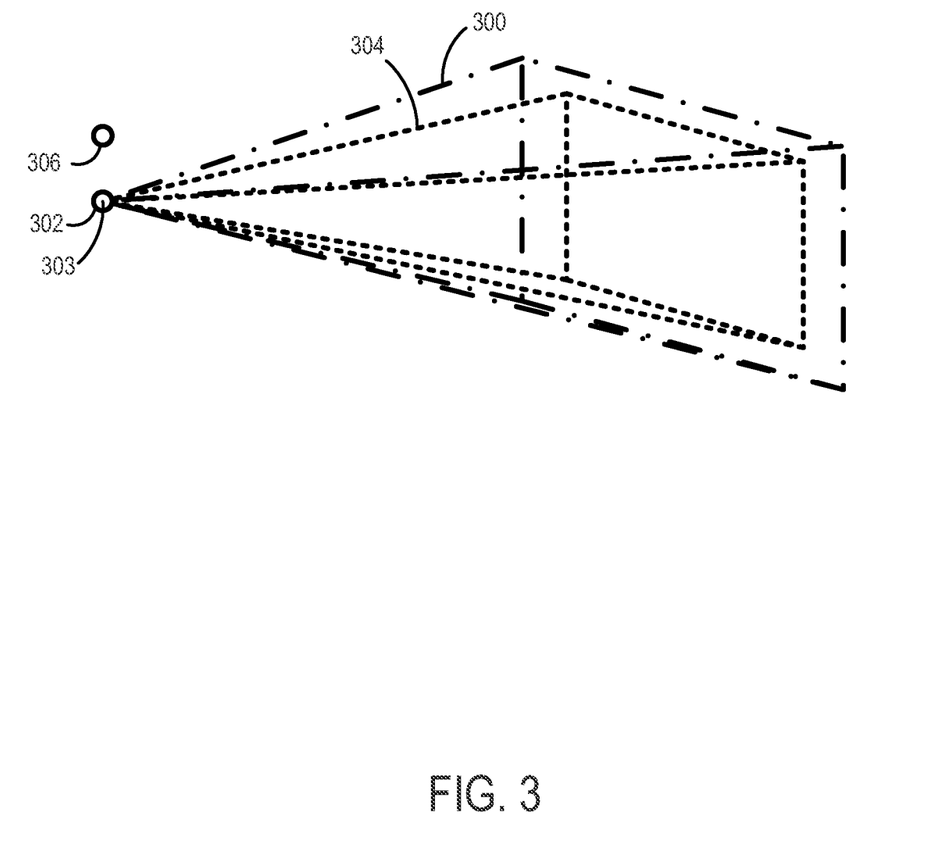
FIG. 3 shows a viewing frustum of a vantage point of a see-through display and a virtual spotlight positioned relative to the vantage point according to an embodiment of the present description.

FIG. 3 schematically shows a user's view frustum 300 through a see-through display 302 in accordance with an embodiment of the present disclosure. View frustum 300 represents an entirety of the real-world environment that is visible through see-through display 302 for one particular vantage point. FIG. 3 also schematically shows an augmentation frustum 304. Augmentation frustum 304 represents those portions of the real-world environment that can be augmented by see-through display 302. In some embodiments, a see-through display may be configured to augment anything that is visible through the see-through display (e.g., view frustum 300 and augmentation frustum 304 match). In other embodiments, the augmentation frustum may be smaller than the view frustum. For example, only a portion of a head-mounted display's lens may be configured to augment reality.

FIG. 3 also shows a virtual spotlight 306. The position and orientation of virtual spotlight 306 may be fixed relative to a vantage point 303 of see-through display 302 such that as the vantage point of the see-through display 302 changes, the position and orientation of the virtual spotlight 306 changes accordingly. In this way, no matter where the vantage point 303 of the see-through display is located and/or no matter how the vantage point 303 of the see-through display is orientated, the position and orientation of virtual spotlight 306 will remain fixed relative to the vantage point 303 of the see-through display 302.

Figure 4:
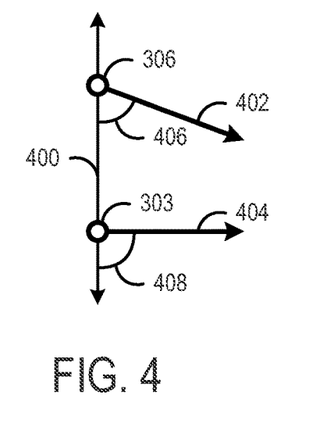
FIG. 4 shows an example of a virtual spotlight fixed relative to a vantage point of a see-through display.
Figure 5:
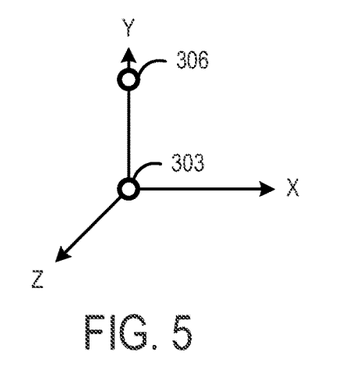
FIG. 5 shows an example of a virtual spotlight fixed relative to a vantage point in three-dimensional space.
Figure 6:
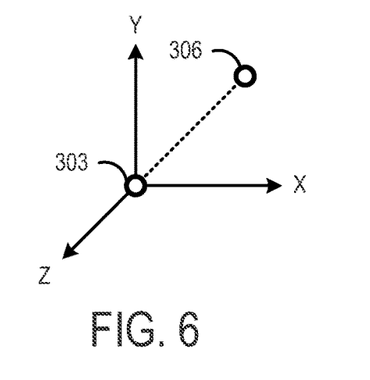
FIG. 6 shows another example of a virtual spotlight fixed relative to a vantage point in three-dimensional space.

FIGS. 4-6 schematically show various examples of the positional relationship between the virtual spotlight and the vantage point of the see-through display.

FIG. 4 shows an example of an orientation of the virtual spotlight 306 relative to an orientation of the vantage point 303 of the see-through display. In particular, the vantage point 303 and the virtual spotlight may be vertically aligned along a vertical axis 400. Vertical axis 400 may be perpendicular to an optical axis of the see-through display and perpendicular to a transverse plane of a head of a user wearing the see-through display. A perspective 402 of the virtual spotlight 306 may be angled downward relative to a perspective 404 of the vantage point 303. In other words, an angle 406 formed between the vertical axis 400 and the perspective 402 of the virtual spotlight may be less than an angle 408 formed between the vertical axis 400 and the perspective 404 of the vantage point. For example, the angle 406 may be 45 degrees and the angle 408 may be 90 degrees. Virtually any orientation of the virtual spotlight relative to the vantage point of the see-through display may be used without departing from the scope of this disclosure.

FIG. 5 shows an example of a position of the virtual spotlight 306 relative to a position of the vantage point 303 of the see-through display. In particular, the virtual spotlight 306 may be vertically offset above the vantage point 303 along a vertical axis (e.g., Y axis), and there may be no horizontal offset (e.g., X and/or Z offset). In other words, the virtual spotlight may be positioned directly above the head of the user.

FIG. 6 shows another example of a position of the virtual spotlight 306 relative to a position of the vantage point 303 of the see-through display. In particular, the virtual spotlight 306 may be vertically offset above the vantage point 303 and skewed to the side. In other words, the virtual spotlight may be positioned above the head of the user and skewed to the right or left. In other embodiments, the virtual spotlight may additionally or alternatively be skewed in front of or behind the see-through display.

It will be understood that the virtual spotlight may be offset from the vantage point in any suitable direction and at any suitable distance.

Figure 7:
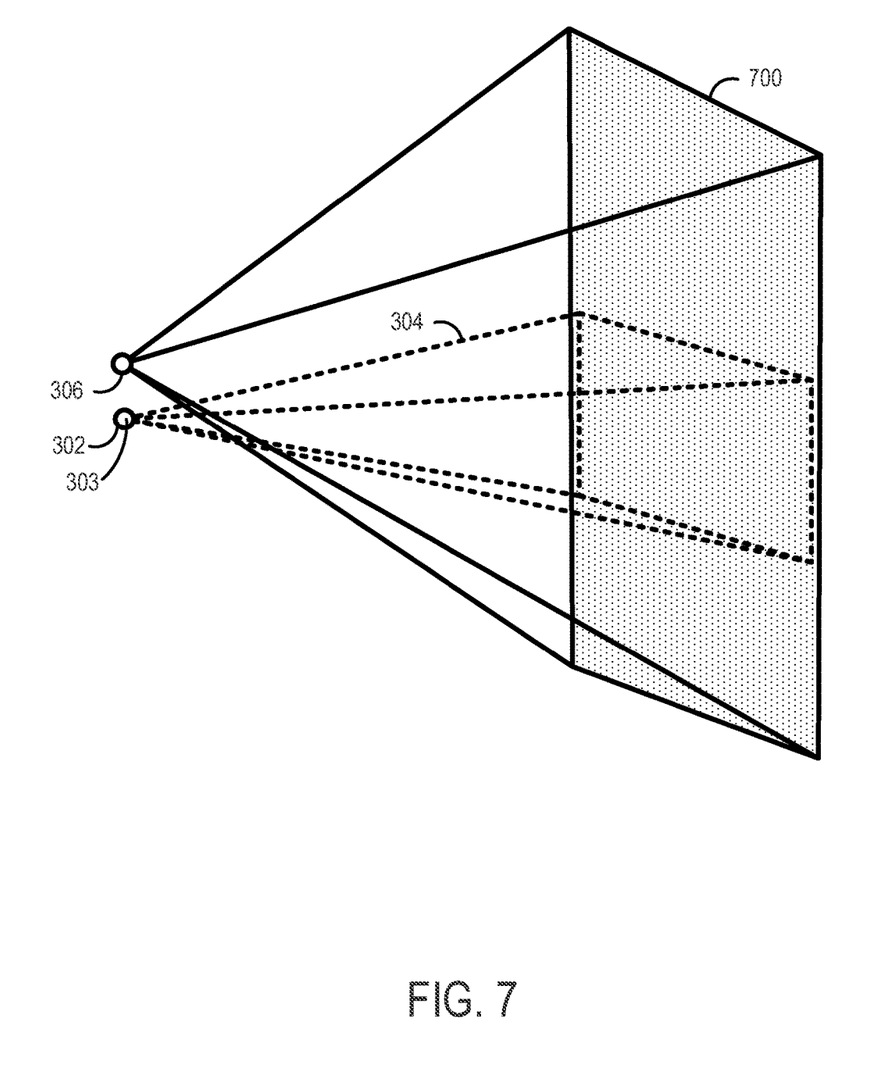
FIG. 7 shows a relative brightness of a see-through display simulated to appear as if originating from a virtual spotlight according to an embodiment of the present description.

FIG. 7 shows a relative brightness 700 of augmentation frustum 304 illuminated to simulate virtual spotlight 306. Note that the relative brightness 700 may be increased with the see-through display. For example, pixels of the see-through display may be illuminated so that objects viewed through the pixels appear to be bathed in light from a spotlight. The virtual spotlight provides a reference point from which to render the relative brightness and construct virtual shadows. The increase in relative brightness may be determined based on a simulated projection of a constant amount of virtual light from the point of view of the virtual spotlight across the augmentation frustum.

Figure 8:
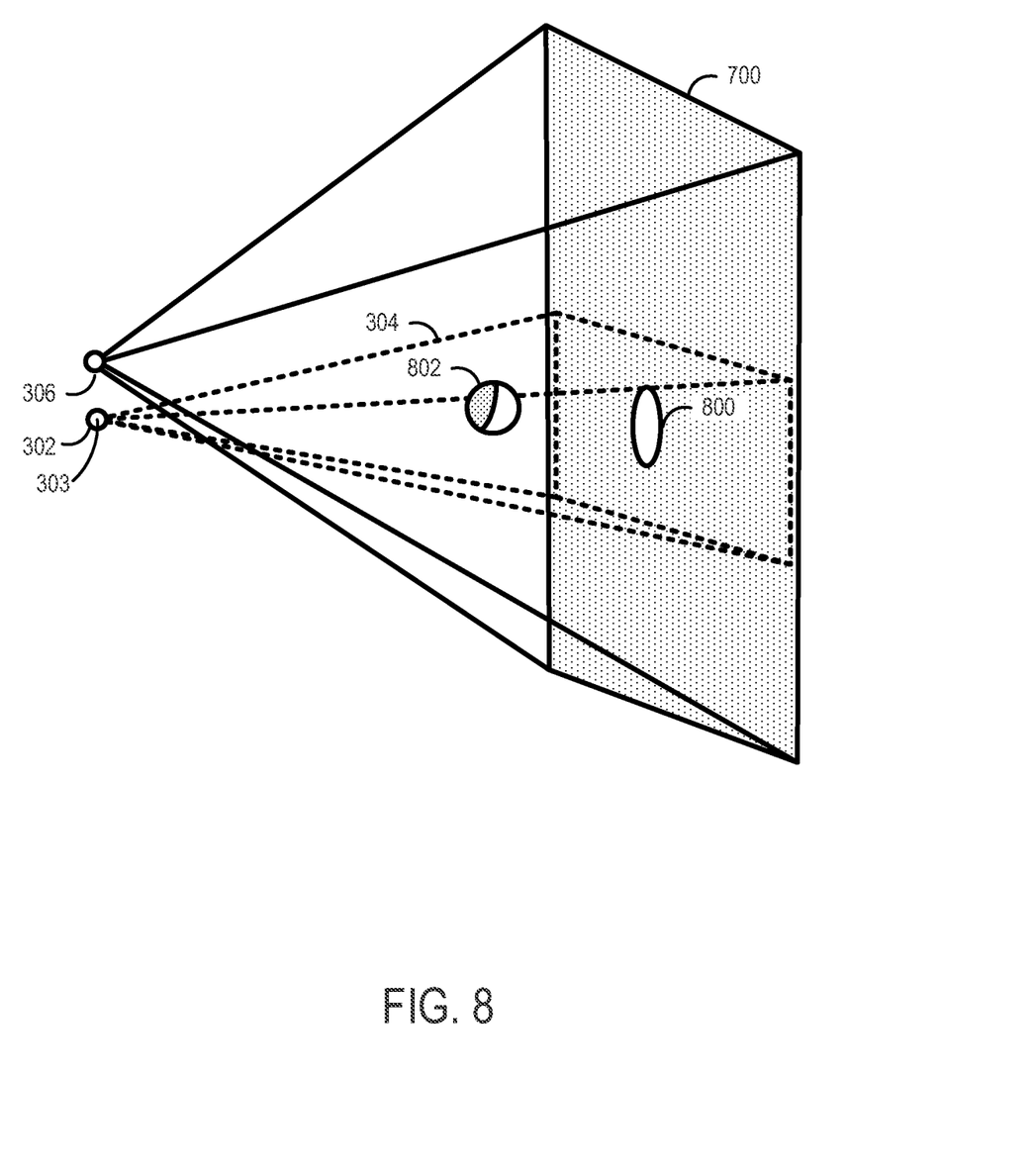
FIG. 8 shows a virtual shadow created based on a virtual spotlight according to an embodiment of the present description.

FIG. 8 shows a virtual shadow 800 created based on the virtual spotlight 306 according to an embodiment of the present description. The virtual shadow 800 may be created by increasing relative brightness 700 around the virtual shadow 800 while not increasing the brightness within the virtual shadow 800. In other words, pixels through which the user views the virtual shadow increase perceived brightness less than pixels through which the user views the area around the virtual shadow. The relative brightness may be increased over an entirety of the remaining unshadowed portions of the real-world background when viewed through the see-through display. In the case where multiple virtual objects are displayed with the see-through display to form multiple virtual shadows, the relative brightness may be increased in an entirety of portions of the see-through display other than those virtual shadows. The position and size of a virtual shadow may be determined based on the position/orientation of a virtual spotlight 306, the position of the virtual object 802, and the position of the surface on which the virtual shadow is to be visible. For example, the size and position of the shadow may simulate a shadow that would result from shining light from the spotlight at the virtual object if the virtual object actually were present in the environment.

Figure 9:
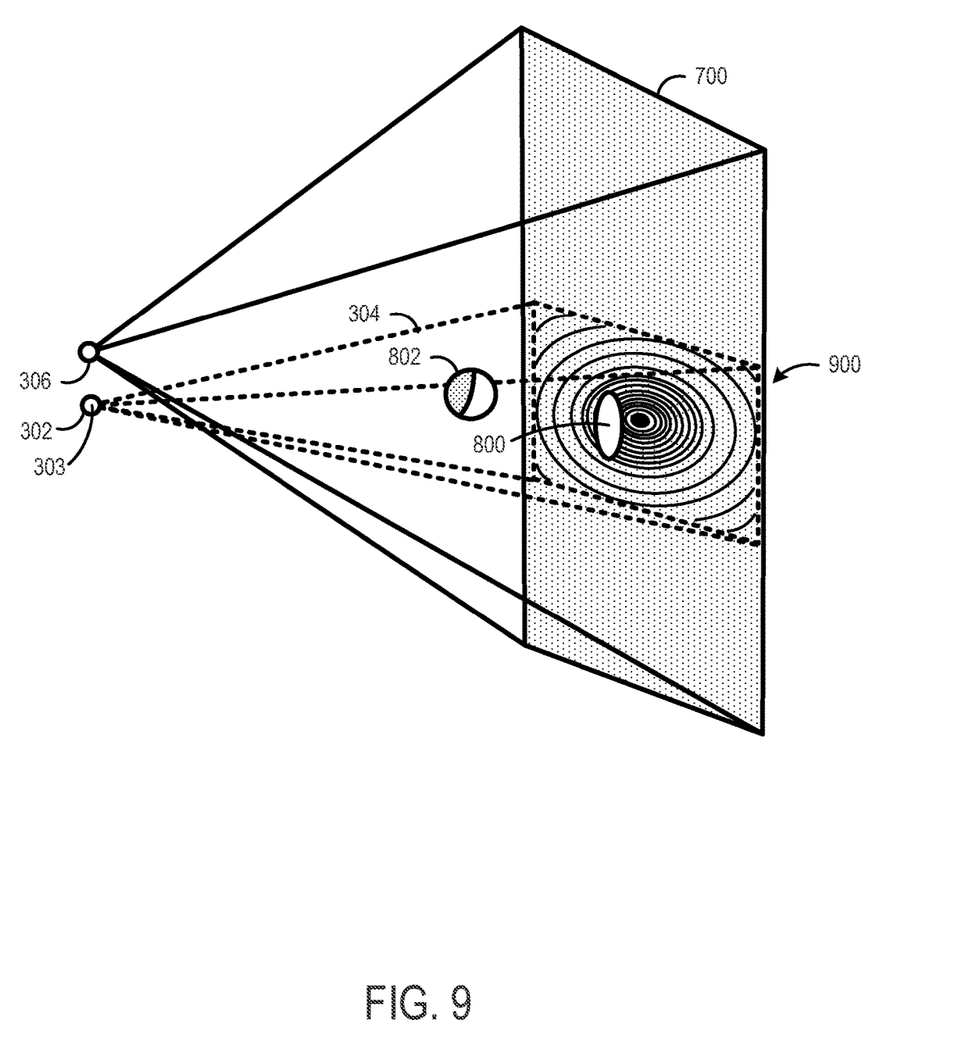
FIG. 9 shows a relative brightness of a real-world background increased in a vignette pattern according to an embodiment of the present description.

FIG. 9 shows a relative brightness of a real-world background increased in a vignette pattern 900 when viewed through the see-through display according to an embodiment of the present description. In the vignette pattern 900, the relative brightness may decrease with increasing closeness to a perimeter of the see-through display. In other embodiments, the relative brightness may decrease with increasing distance from the virtual shadow. In either case, the vignette pattern may by symmetrical, asymmetrical about one or more axes, and/or irregular. In one example, the vignette pattern may be rendered as a post-processing lighting effect after the virtual light and the virtual shadow are determined.

The vignette pattern 900 may be placed in various positions. In one particular example, a center of the vignette pattern may be aligned with a center of the see-through display. In one example, the vignette may be rendered in screen-space coordinates. The screen-space coordinates may be aligned with the vantage point. By rendering the vignette pattern in the screen-space coordinates, the vignette pattern may be locked to the vantage point of the see-through display. As such, the vignette pattern may travel around with the user as the user moves his head. Moreover, by rendering the vignette pattern in screen-space coordinates, the vignette pattern may be generated independent of the real-world background. As such, the vignette pattern need not be positioned based on characteristics of the real-world background and need not react to changes in characteristics of the real-world background.

On the other hand, in some embodiments, the virtual shadow may be rendered in world-space coordinates. By rendering the virtual shadow in world-space coordinates, the shape and/or orientation of the virtual shadow may be dependent on characteristics of the real-world background. For example, if a wall in the real-world background and the virtual object are far away from each other, the virtual shadow may be large. On the other hand, if the wall and the virtual object are close together, then the virtual shadow may be small.

Moreover, in some embodiments, the vignette pattern may be applied only to the relative brightness of the real-world background (e.g., the area of the see-through display enhanced by the virtual spotlight) and the virtual shadow. The vignette pattern may not be applied to virtual objects positioned elsewhere on the see-through display. For example, a virtual object positioned outside of an outer perimeter of the vignette pattern on the see-through display may be viewable by the user, but that virtual object may not cast a virtual shadow.

In the illustrated example, the relative brightness decreases in a concentric rounded pattern. It will be understood that the relative brightness may be decreased or attenuated according to any suitable pattern.

Figure 10:
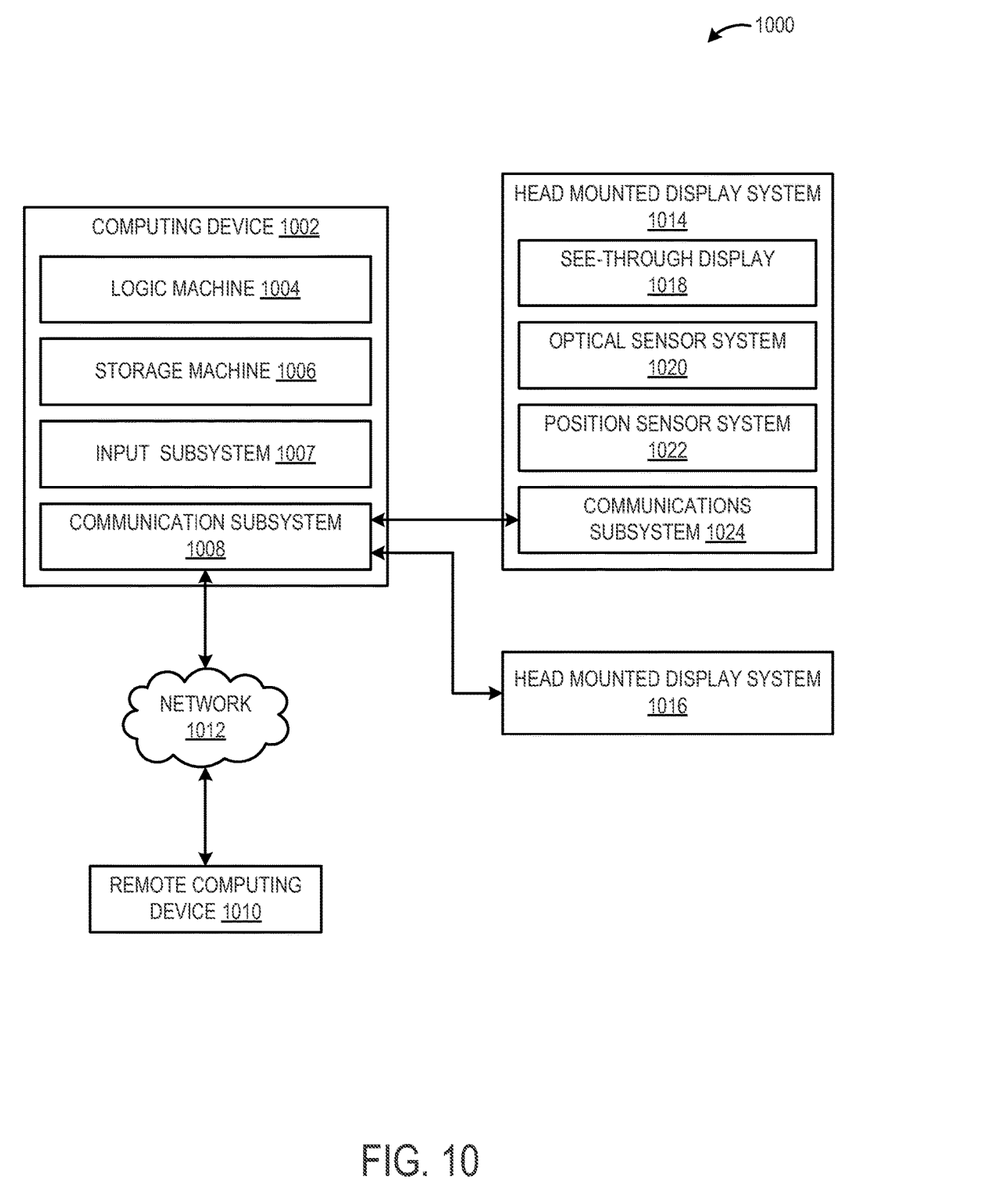
FIG. 10 schematically shows a computing system according to an embodiment of the present description.

FIG. 10 schematically shows a nonlimiting example of a computing system 1000 including a computing device 1002 that may perform one or more of the above described methods and processes. The computing system 1000 is shown in simplified form. It is to be understood that the computing device may be implemented with virtually any computer architecture without departing from the scope of this description. In different embodiments, computing system 1000 may take the form of a HMD peripheral control computer, mainframe computer, server computer, desktop computer, laptop computer, tablet computer, home entertainment computer, network computing device, mobile computing device, mobile communication device, gaming device, etc.

The computing device 1002 of the computing system 1000 includes a logic machine 1004 and a storage machine 1006. The computing device 1002 may optionally include an input subsystem 1007, a communication subsystem 1008, and/or other components not shown in FIG. 10.

The logic machine 1004 may include one or more physical devices configured to execute one or more instructions. For example, the logic machine may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic machine may include one or more processors that are configured to execute software instructions. Additionally or alternatively, the logic machine may include one or more hardware or firmware logic machines configured to execute hardware or firmware instructions. Processors of the logic machine may be single core or multicore, and the programs executed thereon may be configured for parallel or distributed processing. The logic machine may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The storage machine 1006 may include one or more physical, non-transitory, devices configured to hold data and/or instructions executable by the logic subsystem to implement the herein described methods and processes. When such methods and processes are implemented, the state of data-holding subsystem 514 may be transformed (e.g., to hold different data).

The storage machine 1006 may include removable and/or built-in devices. The storage machine 1006 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage machine 1006 may include volatile, nonvolatile, dynamic, static, read/write, read-only, random-access, sequential-access, location-addressable, file-addressable, and/or content-addressable devices.

It will be appreciated that storage machine 1006 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine 1004 and the storage machine 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the input subsystem 1007 may comprise or interface with one or more user-input devices such as a keyboard, mouse, touch, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a display subsystem such as the head-mounted display system 1014 may be used to present a visual representation of data held by storage machine 1006. As the herein described methods and processes change the data held by the storage machine, and thus transform the state of the storage machine, the state of the display subsystem may likewise be transformed to visually represent changes in the underlying data (e.g., to display virtual objects and/or create the illusion of virtual shadows). A display subsystem may include one or more display devices utilizing virtually any type of see-through display technology. Such display devices may be combined with the logic machine 1004 and/or the storage machine 1006 in a shared enclosure, or such display devices may be peripheral display devices.

When included, communication subsystem 1008 may be configured to communicatively couple the computing device 1002 with one or more other computing devices, such as a remote computing device 1010. The communication subsystem 1008 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow the computing device 1002 to send and/or receive messages to and/or from other devices via a network 1012, such as the Internet.

The computing system 1000 further includes one or more head-mounted display systems, such as head-mounted display systems 1014 and 1016 depicted schematically in FIG. 10. The head-mounted display system 1014 is depicted in further detail, including a see-through display 1018, an optical sensor system 1020, a position sensor system 1022, and a communication subsystem 1024. The head-mounted display system 1016 may similarly include a see-through display, optical sensor system, position sensor system, and communication subsystem. Previously described head-mounted display system 100 of FIG. 1 provides a non-limiting example representative of the head-mounted display systems 1014 and 1016. The head-mounted display systems 1014 and 1016 may communicate with computing device 1002 and/or remote computing device 1010 via wired or wireless communications. In some embodiments, a head-mounted display system may include an onboard computing device. In other words, the computing device 1002 and the head mounted display system 1014 may be integrated in a single device.

The see-through display 1018 may be configured to visually augment an appearance of a physical environment to a user viewing the physical environment through the see-through display. For example, the appearance of the physical environment may be augmented by graphical content (e.g., one or more pixels each having a respective color and brightness) that is presented via the see-through display. The see-through display may be configured so that a user is able to view a real object in physical space through one or more partially transparent pixels that are displaying a virtual object.

In some embodiments, the see-through display 1018 may support selective filtering of light received from the physical environment before reaching an eye of a user wearing the head-mounted display system. Such filtering may be performed on individual pixels or on groups of pixels. As one example, the selective filtering or removal of ambient light may be supported by the see-through display at a different resolution (e.g., a lower resolution or a higher resolution) than the resolution supported by the see-through display for the presentation of lighted graphical content (e.g., illuminated pixels). In some embodiments, the see-through display 1018 may include a first display layer that adds light in the form of one or more illuminated pixels, and a second display layer that filters ambient light received from the physical environment. These layers may have different display resolution, pixel density, and/or display capabilities. In some embodiments, light filters may be omitted from the see-through display.

The optical sensor system 1020 may include one or more optical sensors for observing visible spectrum and/or infrared light of the ambient lighting conditions of a physical environment and/or a user. One or more of these optical sensors may take the form of a depth camera. Time-resolved images from one or more of these depth cameras may be registered to each other and/or images from another optical sensor such as a visible spectrum camera, and may be combined to yield depth-resolved video.

A depth camera may be take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

A depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination, but the integration times for the two or more depth cameras may differ, such that a pixel-resolved time-of-flight of the pulsed illumination, from the source to the scene and then to the depth cameras, is discernible from the relative amounts of light received in corresponding pixels of the two depth cameras.

The position sensor system 1022 may include one or more position sensors. These positions sensors may include accelerometers and/or gyroscopes that provide an indication or measurement of a location and/or orientation of the head-mounted display system in multi-dimensional space. As one example, the position sensor system 1022 may be configured as a six-axis or six-degree of freedom position sensor system. This example position sensor system may, for example, include three accelerometers and three gyroscopes to indicate or measure a change in location of the head-mounted display system within three-dimensional space along three orthogonal axes (e.g., x, y, z) and a change in an orientation of the head-mounted display system about the three orthogonal axes (e.g., roll, pitch, yaw).

The position sensor system 1022 may support other suitable positioning techniques, such as GPS or other global navigation system. For example, the position sensor system 1022 may include a wireless receiver (e.g., a GPS receiver or cellular receiver) to receive wireless signals broadcast from satellites and/or terrestrial base stations. These wireless signals may be used to identify a geographic location of the head-mounted display system. Positioning information obtained from wireless signals received by the head-mounted display system may be combined with positioning information obtained from other position sensors, such as accelerometers and/or gyroscopes to provide an indication of location and/or orientation of the head-mounted display system. While specific examples of position sensor systems have been described, it will be appreciated that other suitable position sensor systems may be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a see-through display including a plurality of at least partially transparent pixels, the method comprising:
    displaying an image of a virtual object with an object subset of the plurality of at least partially transparent pixels by directing additive image light to a user eye via the object subset of the plurality of at least partially transparent pixels such that the virtual object appears in front of a real-world background when viewed through the see-through display; and
    creating an illusion of a virtual shadow with a shadow subset and a neighboring background subset of the plurality of at least partially transparent pixels by not directing additive image light to the user eye via the shadow subset while directing additive image light to the user eye via the neighboring background subset in a vignette pattern displayed with greater brightness adjacent the virtual shadow and displayed with decreasing brightness away from the virtual shadow such that the virtual shadow appears to result from a spotlight that is fixed relative to a vantage point of the see-through display.

2. The method of claim 1, wherein the spotlight is vertically offset from the vantage point and a perspective of the spotlight is angled downward relative to a perspective of the vantage point.

3. The method of claim 1, wherein additive image light is directed to the user eye via an unshadowed subset of the plurality of at least partially transparent pixels that includes all at least partially transparent pixels not included in the shadow subset.

4. The method of claim 1, wherein a relative brightness of the at least partially transparent pixels in the neighboring background subset decreases with increasing closeness of the at least partially transparent pixels of the neighboring background subset to a perimeter of the see-through display.

5. The method of claim 1, further comprising:
    blocking ambient light from reaching the user eye via the shadow subset.

6. The method of claim 1, wherein directing additive image light to the user eye via the neighboring background subset includes modulating the additive image light to match colors of the real-world background.

7. A method of operating a see-through display, the method comprising:
displaying an image of a virtual object such that the virtual object appears in front of a real-world background when viewed through the see-through display; and
increasing a relative brightness of the real-world background by directing additive image light from the see-through display to a user eye in a vignette pattern around a virtual shadow of the virtual object when viewed through the see-through display without directing additive image light from the display to the virtual shadow, the vignette pattern displayed with greater brightness adjacent the virtual shadow and displayed with decreasing brightness away from the virtual shadow.

8. The method of claim 7, wherein the relative brightness decreases with increasing closeness to a perimeter of the see-through display.

9. The method of claim 7, wherein the virtual shadow appears to result from a spotlight that is fixed relative to a vantage point of the see-through display.

10. The method of claim 9, wherein the spotlight is vertically offset from the vantage point and a perspective of the spotlight is angled downward relative to a perspective of the vantage point.

11. The method of claim 7, wherein the relative brightness is increased over an entirety of unshadowed portions of the real-world background.

12. The method of claim 7, wherein the see-through display does not increase a brightness of the virtual shadow.

13. The method of claim 7, further comprising:
increasing the relative brightness of the real-world background with display light corresponding to colors of the real-world background.

14. A head-mounted display system, comprising:
a see-through display;
an image production system configured to display an image on the see-through display;
a first image sensor configured to detect a vantage point of the see-through display;
a logic machine; and
a storage machine holding instructions executable by the logic machine to:
determine the vantage point of the see-through display;
display an image of a virtual object such that the virtual object appears in front of a real-world background when viewed through the see-through display; and
increase a relative brightness of the real-world background by directing additive image light from the see-through display to a user eye in a vignette pattern around a virtual shadow of the virtual object when viewed through the see-through display without directing additive image light from the display to the virtual shadow, the vignette pattern displayed with greater brightness adjacent the virtual shadow and displayed with decreasing brightness away from the virtual shadow such that the virtual shadow appears to result from a spotlight that is fixed relative to the vantage point of the see-through display.

15. The head-mounted display system of claim 14, wherein the relative brightness decreases with increasing closeness to a perimeter of the see-through display.

16. The head-mounted display system of claim 14, wherein the spotlight is vertically offset from the vantage point and a perspective of the spotlight is angled downward relative to a perspective of the vantage point.

* * * * *